United States Patent

Ivanov et al.

(10) Patent No.: US 10,397,739 B2
(45) Date of Patent: Aug. 27, 2019

(54) SUPPORTING THE CREATION OF A RADIO MAP

(71) Applicant: HERE Global B.V., Eindhoven (NL)

(72) Inventors: Pavel Ivanov, Tampere (FI); Lauri Aarne Johannes Wirola, Tampere (FI); Jari Tapani Syrjärinne, Tampere (FI); Mikko Blomqvist, Lempäälä (FI); Muhammad Irshan Khan, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/448,771

(22) Filed: Mar. 3, 2017

(65) Prior Publication Data

US 2018/0255430 A1    Sep. 6, 2018

(51) Int. Cl.
```
H04W 4/02      (2018.01)
H04B 17/318    (2015.01)
G01S 5/02      (2010.01)
G01S 19/46     (2010.01)
```
(Continued)

(52) U.S. Cl.
CPC ........... *H04W 4/023* (2013.01); *G01S 5/0252* (2013.01); *G01S 19/46* (2013.01); *H04B 17/318* (2015.01); *H04W 4/029* (2018.02); *H04W 64/00* (2013.01)

(58) Field of Classification Search
CPC ..... H04W 4/023; H04W 64/00; H04W 4/029; G01S 5/0252; G01S 19/46; H04B 17/318
See application file for complete search history.

(56) References Cited

U.S. PATENT DOCUMENTS 9,121,922 B2    9/2015 Jarvis et al.
9,301,100 B1 *  3/2016 Jampani .............. G01S 5/0278
(Continued)

FOREIGN PATENT DOCUMENTS

WO    WO2016162568 A1    10/2016

OTHER PUBLICATIONS

Hui Wang et al.: "Fusion of Barometric Sensors, WLAN Signals and Building Information for 3-D Indoor/campus Localization", http://isas.uka.de/Material/AltePublikationen/mfi_06wang.pdf, Apr. 13, 2006.
(Continued)

*Primary Examiner* — Mazda Sabouri
(74) *Attorney, Agent, or Firm* — Lempia Summerfield Katz LLC

(57) ABSTRACT

A system obtains from each of a plurality of mobile devices a batch of data for a site. A batch includes data enabling a determination of a reference position, sensor data of motion sensors and sets of results of measurements performed by the mobile device on radio signals at different locations, each set including at least one indication of a received signal strength of radio signals and an associated identifier of at least one radio transmitter transmitting the radio signals. In at least two iterations, the system processes each batch to determine for each mobile device a (refined) sequence of fingerprints associating a respective position, which is based on the at least one reference position, the sensor data (and estimated characteristics of radio transmitters), with each set of results of measurements; and estimates characteristics of the radio transmitters based on the (refined) sequences of fingerprints.

18 Claims, 5 Drawing Sheets

(51) Int. Cl.
*H04W 4/029* (2018.01)
*H04W 64/00* (2009.01)

(56) References Cited

U.S. PATENT DOCUMENTS

| | | | |
|---|---|---|---|
| 2009/0131073 A1* | 5/2009 | Carlson | G01S 5/0205 455/456.1 |
| 2011/0059752 A1 | 3/2011 | Garin et al. | |
| 2012/0244900 A1* | 9/2012 | Tian | H04W 72/1273 455/509 |
| 2013/0162481 A1* | 6/2013 | Parvizi | G01S 3/023 342/452 |
| 2013/0273938 A1 | 10/2013 | Ng et al. | |
| 2013/0281111 A1* | 10/2013 | Syrjarinne | G01S 5/0252 455/456.1 |
| 2014/0073363 A1 | 3/2014 | Tidd et al. | |
| 2014/0171098 A1 | 6/2014 | Marti et al. | |
| 2014/0171118 A1* | 6/2014 | Marti | G01S 5/0252 455/456.3 |
| 2014/0194137 A1* | 7/2014 | Do | G01S 5/0252 455/456.1 |
| 2014/0213299 A1* | 7/2014 | Marti | G06F 3/048 455/456.3 |
| 2014/0269614 A1* | 9/2014 | Maguire | H04W 4/80 370/331 |
| 2015/0346317 A1 | 12/2015 | Patel et al. | |
| 2016/0044504 A1 | 2/2016 | Edge | |
| 2016/0091593 A1* | 3/2016 | Millman | G01C 21/20 701/468 |
| 2016/0094951 A1* | 3/2016 | Yang | H04W 4/029 455/456.1 |
| 2016/0094954 A1* | 3/2016 | Millman | H04W 4/046 455/456.2 |
| 2018/0075643 A1* | 3/2018 | Sequeira | G01C 21/206 |

OTHER PUBLICATIONS

PCT International Search Report and Written Opinion of the International Searching Authority dated Apr. 18, 2018 for corresponding PCT/EP2018/055142.

* cited by examiner

SUPPORTING THE CREATION OF A RADIO MAP

FIELD OF THE DISCLOSURE

The disclosure relates to the field of positioning and more specifically to supporting the creation of a radio map.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a position estimate and measurements taken from a radio interface. The position estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. A crowd-sourcing based training stage may enable an exhaustive survey of a site, for instance all floors, spaces and rooms of a building, in a short time at limited costs. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current position based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

An example embodiment of a method comprises obtaining from each of a plurality of mobile devices a batch of data for a site, a batch of data from a respective mobile device including data enabling a determination of at least one reference position of the mobile device, sensor data of at least one motion sensor of the mobile device, and sets of results of measurements performed by the mobile device on radio signals at different locations of the site, each set comprising at least one indication of a received signal strength of radio signals and an associated identifier of at least one radio transmitter transmitting the radio signals. The method further comprises processing each batch of data to determine for each mobile device a sequence of fingerprints associating a respective position, which is based on the at least one reference position and the sensor data, with each set of results of measurements. The method further comprises estimating at least one characteristic of each of a plurality of radio transmitters based on sequences of fingerprints determined for the plurality of mobile devices. The method further comprises in at least one iteration processing each batch of data to determine for each mobile device a refined sequence of fingerprints associating a respective position, which is based on the reference position, the sensor data and estimated characteristics of the plurality of radio transmitters, with each set of results of measurements; and estimating at least one characteristic of each of the plurality of radio transmitters based on the refined sequences of fingerprints determined for the plurality of mobile devices. The method may be performed by at least one apparatus.

An example embodiment of a first system comprises means for causing performance of the actions of any embodiment of the presented method. The means may be distributed to one or more apparatuses.

The means of the system may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second system comprises at least one processor and at least one memory including computer program code, the at least one memory and the computer program code configured to, with the at least one processor, cause at least one device at least to perform the actions of any embodiment of the presented method. The at least one processor and/or the at least one memory may belong to a single apparatus, like a server, or be distributed to several apparatuses.

Any of the described systems may comprise only the indicated components or one or more additional components. Any of the described systems may be an apparatus, be a part of an apparatus or be composed of a plurality of apparatuses.

Moreover an example embodiment of a non-transitory computer readable storage medium, in which computer program code is stored, is presented. The computer program code causes at least one device to perform the actions of any embodiment of the presented method when executed by at least one processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer or like an integrated or exchangeable memory card, or it may be intended for distribution of the program code, like an optical disc or memory stick or memory card.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first systems is an information providing system. In certain embodiments, the means of the presented first system are processing means.

In certain embodiments, any of the presented methods is a method for supporting the creation of a radio map. In certain embodiment, any of the presented systems is a system for supporting the creation of a radio map.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
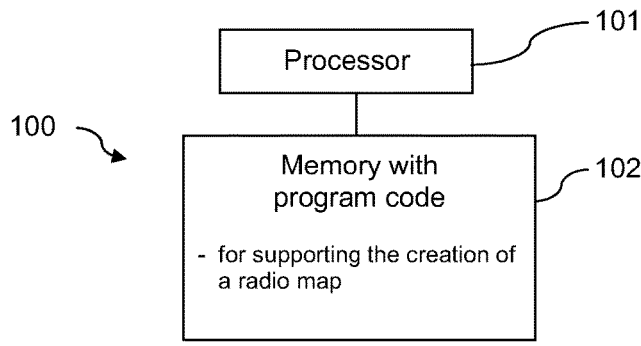
FIG. 1 is a schematic block diagram of an example embodiment of a system.

FIG. 1 is a schematic block diagram of an example embodiment of a system 100 according to the disclosure. System 100 comprises at least one processor 101 and, linked to the at least one processor 101, at least one memory 102. The at least one memory 102 stores computer program code for supporting the creation of a radio map. In this context, the term radio map may refer to any collection of data that provides location-linked information on a radio environment. The computer program code may be example computer program code according to the disclosure, and the at least one memory 102 may be an example computer readable medium according to the disclosure. The at least one processor 101 is configured to execute computer program code stored in the at least one memory 102 in order to cause at least one device to perform desired actions.

System 100 may be a device, like a server, or a combination of devices, like servers in the Cloud. System 100 may equally be a module, like a chip, circuitry on a chip or a plug-in board, for a device. Optionally, system 100 may comprise various other components, like a data interface, a user interface, a further memory, a further processor, etc.

An example operation of system 100 will now be described with reference to the flow chart of FIG. 2. The operation is an example embodiment of a method according to the disclosure. The at least one processor 101 and the program code stored in the at least one memory 102 cause at least one device to perform the operation when program code is retrieved from the at least one memory 102 and executed by the at least one processor 101.

The at least one device that is caused to perform the operation may be or belong to system 100, a device comprising system 100.

The at least one device obtains from each of a plurality of mobile devices a batch of data for a site. A batch of data from a respective mobile device includes data enabling a determination of at least one reference position of the mobile device. A batch furthermore includes sensor data of at least one motion sensor of the mobile device. A batch furthermore includes sets of results of measurements performed by the mobile device on radio signals at different locations of the site. Each set comprises at least one indication of a received signal strength of radio signals and an associated identifier of at least one radio transmitter transmitting the radio signals. (action 201)

The at least one device furthermore processes each batch of data to determine for each mobile device a sequence of fingerprints associating a respective position, which is based on the at least one reference position and the sensor data, with each set of results of measurements. (action 202)

The at least one device furthermore estimates at least one characteristic of each of a plurality of radio transmitters based on sequences of fingerprints determined for the plurality of mobile devices. (action 203)

In at least one iteration, the at least one device furthermore processes each batch of data to determine for each mobile device a refined sequence of fingerprints associating a respective position, which is based on the reference position, the sensor data and estimated characteristics of the plurality of radio transmitters, with each set of results of measurements; and estimates at least one characteristic of each the plurality of radio transmitters based on the refined sequences of fingerprints determined for the plurality of mobile devices. (actions 204, 205) It is to be understood that the loop may be terminated in any iteration after the determination of a refined sequence of fingerprints in action 204 or after the estimation of the characteristics of the radio transmitters in action 205.

Radio map creation requires that mobile devices that are used for performing radio measurements at a site can be accurately located in order to enable georeferencing of measurement results, and thus to enable a creation and collection of fingerprints. Satellite signals may not be available for automatically obtaining positions of measurements at certain sites, for example indoors, or they may provide position estimates with poor accuracy. Therefore, currently, the position is usually input manually by the user of the mobile devices, in particular by pinpointing the position on a displayed indoor map. Obviously, this is a laborious process and requires a lot of resources, in particular when considering that radio map data has to be constantly monitored and updated in order to capture changes in the radio environment and to maintain the positioning performance. It is prone to input-errors and not suited for a crowd-sourcing approach.

To some extent is may be possible to derive position information indoors by extending a series of satellite signal based position estimates with data provided by motion sensors of mobile devices. In this way, highly precise reference position information can be extended indoors for georeferencing the radio measurements. Such motion sensors may comprise for instance accelerometers and gyroscopes.

However firstly, a sensor-based solution provides accurate positioning fixes, that is, positions with a deviation of 2-3 meters, during a limited time only, for instance for no longer than 1-3 minutes. Thus, the accuracy of position estimates degrades rapidly after a reliable absolute geolocation (e.g. from a GNSS based positioning) becomes unavailable. This is mainly because of noise in accelerometers and drift in gyroscopes. These effects cause the estimated path to drift away at an accelerating speed.

Second, misalignment may occur with a motion sensor based positioning. This is because a mobile device can be held freely, for instance in hand, pocket or backpack, and is not rigidly attached to a human body. As a result, the "direction" of the mobile device may differ from that of the user moving around. This means that the motion sensor frame may be disoriented with respect to the user motion frame, which makes the estimation of the user motion quite challenging unless the estimator is updated with new absolute position estimates (e.g. from GNSS based positioning) quite often. For example, if the user changes the device orientation from 'portrait' to 'landscape' while walking straight, a user trajectory that is estimated based on a gyroscope may take a 90-degree turn even though user walked in a straight line.

Third, a misorientation may occur with a motion sensor based positioning. Inertial sensors only provide relative information. That is, it may be possible to obtain a track that looks correct, but its orientation in the global coordinate system may be unknown. It may be rotated by a certain amount with respect to the building. A magnetometer (compass) may be used to alleviate this problem to some extent, but magnetometer readings are generally quite noisy indoors.

Fourth, the accuracy of GNSS-based position estimates used as reference positions for a motion sensor based positioning may be poor and biased close to buildings, because of signal blockage and reflections by the buildings. This may cause a misreferencing of the track, that is, the track may have an incorrect starting point. This means that the track would be translated to an incorrect position by the amount of the initial error in the GNSS-based position estimate.

The above factors render a survey of an indoor radio environment without user interaction to obtain geo-tagged radio samples from indoors difficult.

The disclosure proceeds from the consideration that tracks of a plurality of mobile devices can be "stitched together" at points, which are shared between the tracks; and that such points may be locations at which strong signals of a respective radio transmitter are observed.

Certain embodiments of the disclosure therefore provide that an iterative process is used, which determines fingerprints from data provided by a plurality of mobile devices, which estimates characteristics of radio transmitters based on the fingerprints, which uses the estimated characteristics of radio transmitters as reference information for refining the position data in the fingerprints, and which uses the refined position data in the fingerprints in turn for refining the estimated characteristics of radio transmitters. The fingerprints comprise position data and associated results of measurements on radio signals, with the position data estimated based on reference positions of mobile devices, on sensor data of the mobile devices and—once available—on locations of radio transmitters.

Certain embodiments of the disclosure may have the effect that they enable a generation of a radio map providing additional reference data for a site. Certain embodiments of the disclosure may have the effect that sensor-based tracks of mobile devices may rely on more reference data. Certain embodiments of the disclosure may have the effect that the additionally obtained reference data as such may be used for estimating the position of a mobile device.

Figure 2:
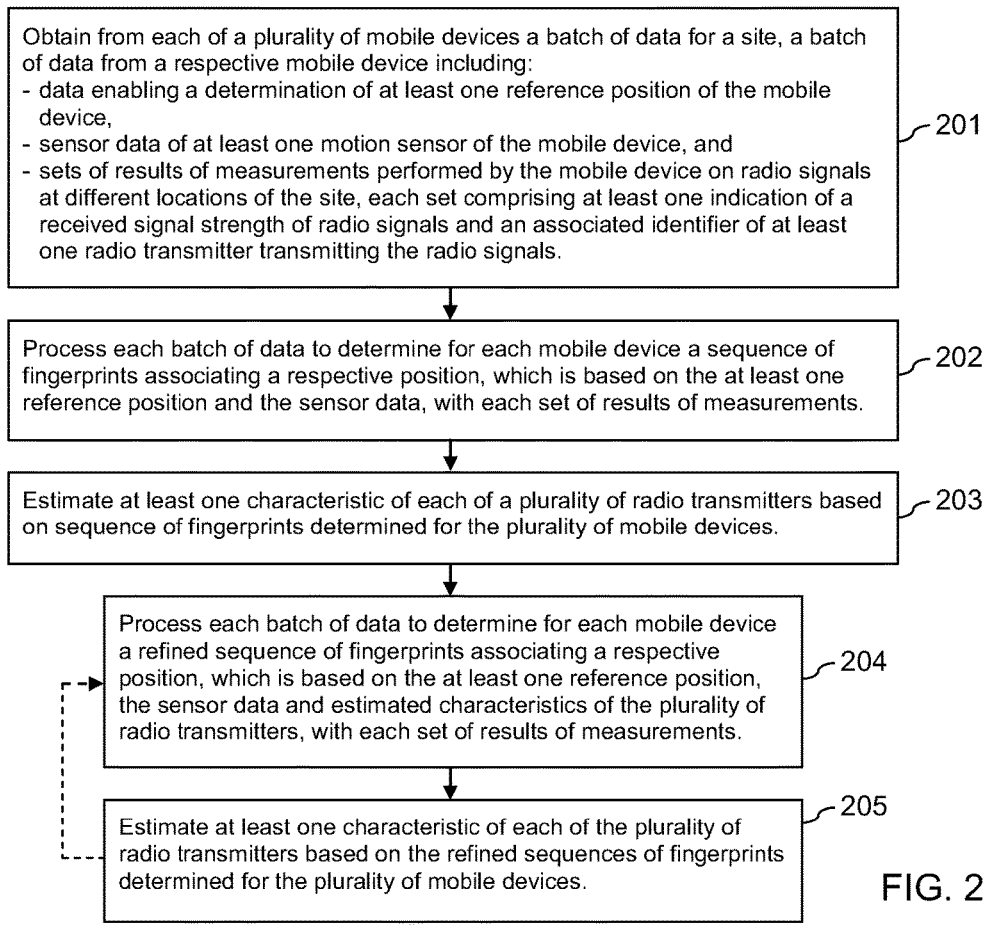
FIG. 2 is a flow chart illustrating an example embodiment of a method.

System 100 illustrated in FIG. 1 and the method illustrated in FIG. 2 may be implemented and refined in various ways.

The site may be an indoor site, but it may equally be an outdoor site or comprise outdoor areas.

An indication of a received signal strength of radio signals may be for instance a received signal strength indication (RSSI) or a physical Rx level in dBm with a reference value of 1 mW, etc. Another kind of indication of a received signal strength of radio signals may be for instance an indication of a path loss of radio signals at a particular location.

The plurality of radio transmitters distributed at the site may be of one or more types.

The considered radio transmitters that are distributed at the site may comprise any kind of terrestrial transmitter, in particular, though not exclusively, any kind of non-cellular terrestrial transmitter. In example embodiments, the radio transmitters comprise a wireless local area network access point and/or a Bluetooth™ beacon and/or a Bluetooth beacon enabling Bluetooth low energy mode and/or a Bluetooth low energy beacon.

WLAN access points and Bluetooth beacons are already installed in many buildings. Furthermore, WLAN and Bluetooth technologies are supported by many mobile user devices by default, like by most smartphones, tablets, laptops and feature phones. Evaluating the received signal strength of signals transmitted by WLAN access points, Bluetooth beacons and/or BLE beacons may thus have the effect that the determined reference locations may be based in some embodiments on an existing infrastructure in buildings and/or be exploited with existing capabilities in many mobile devices. As a result, the approach may be globally scalable and have low maintenance and deployment costs. The deployment of new infrastructure, including for example beacons and tags, is possible but not necessary. In addition, the end-user experience may be acceptable with these technologies, since a horizontal positioning accuracy of 2-3 meters as well as close to 100% reliability in floor detection may be achieved. The radio transmitters may be stand-alone devices or be integrated into or attached to some other device. The use of Bluetooth low energy may limit the energy consumption at all involved devices. A Bluetooth beacon that is employed for the disclosure may be any kind of Bluetooth beacon complying with any present or future standard.

It is to be understood, however, that other types of radio transmitters than variations of WLAN access points or Bluetooth beacons may be used as well, for instance tags or other devices that are configured to transmit ultra-wideband (UWB) signals or ultra-sound signals or any wireless signals that might emerge in the future.

If the radio transmitters comprises alternatively or in addition a cellular transmitter, any of the radio transmitters may be for instance a base station of a Global System for Mobile Communications (GSM) network, of a CDMA2000 network, of a Universal Mobile Telecommunications System (UMTS) network, of a long term evolution (LTE) network, or of any other current or future kind of cellular network.

The obtained data enabling a determination of at least one reference position of the mobile device may comprise an indication of a reference position or data that enables a computation of a reference position of the mobile device.

In example embodiments, the at least one reference position of a respective mobile device comprises a satellite signal based position; and /or a position determined based on at least one barometer value and an altitude map; and/or a position determined based on at least one barometer value and inter-floor connector information. A satellite signal based position may be based for instance on signals of a global and/or local navigation system, like GPS, GLONASS, Galileo, Beidou and/or the quasi-zenith satellite system (QZSS), etc. Barometer values and an altitude map may enable for instance a reliable determination of a floor at which the mobile device is located. A reference position may furthermore be determined for instance based on barometer values and inter-floor connector information by detecting a fast change in altitude in view of barometer measurements, by determining from inter-floor connector information a location in the vicinity of a current motion sensor based position estimate, which indicates a connection between floors of a building, and by using this position as a reference position. A connection between floors may be given for instance by stairs, elevators, escalators, etc. Using inter-floor connector information may have the effect that a larger number of reliable reference positions may be available, in particular indoors.

In example embodiments, the sensor data of the motion sensor(s) of a respective mobile device comprises data of an accelerometer of the mobile device and/or of a gyroscope of the mobile device and/or of a compass of the mobile device. An accelerometer may be suited to indicate an amount of motion in a certain direction. A gyroscopes may be suited to detect a rotation of a mobile device. Data provided by a compass may be suited to align the assumed motion to a global or local coordinate system. Data provided by a barometer may help in addition in determining an altitude and/or floor at which the mobile device is located.

In example embodiments, the at least one characteristic of each of the plurality of radio transmitters comprises a location of each of the plurality of radio transmitters. Such estimated locations may easily be used as additional reference locations when determining refined sequences of fingerprints for the mobile devices. In other example embodiments, the at least one characteristic of each of a plurality of radio transmitters may comprise alternatively or in addition a definition of a coverage area of each of the plurality of radio transmitters and/or a grid based indication of expected received signal strength values at the site for each of the plurality of radio transmitters. A coverage area of a transmitter may be for instance in the form of an ellipse, and a central point of the ellipse may be used as additional reference location. Grid points of a grid may be defined to correspond to locations at the site, and a grid based indication of expected received signal strength values at the site may indicate for instance for all or a plurality of grid points an expected received signal strength value for one or more radio transmitters. The grid point with the associated strongest expected received signal strength for a radio transmitter may then for instance be assumed to represent a further reference location.

The at least one characteristic of a radio transmitter may be estimated in various ways based on determined (original or refined) sequences of fingerprints. In example embodiments, estimating at least one characteristic of a radio transmitter based on sequences of fingerprints may comprise estimating a location of the radio transmitter as a weighted average of positions associated in the sequences of fingerprints with a set of results of measurements comprising an identifier of the radio transmitter. For the weighted average, a weight of a respective position may be selected for instance to be inversely proportional to an uncertainty of the position. For the weighted average, a weight of a respective position may alternatively be selected to be proportional to a radio signal strength that is associated in the respective set with the identifier of the radio transmitter. It is to be understood that a weight of a respective position may also depend on both, uncertainty and radio signal strength. In example embodiments, estimating a location of a radio transmitter may comprise estimating the location using a Kalman filter.

In example embodiments, a respective position in a refined sequence of fingerprints is pulled towards an estimated location of a radio transmitter that corresponds to or is based on the at least one characteristic of the radio transmitter, when an indication of a received signal strength associated with the identifier of the radio transmitter in a set of results of measurements exceeds a predetermined value. This may have the effect that that the estimated location of a radio transmitter may function as a reference location for the sensor based positioning. The accuracy of the estimated location of a radio transmitter may improve with the number of iterations.

In example embodiments, the at least one iteration is repeated in a loop until a predetermined convergence criterion is met. Such a convergence criterion may comprise for instance that a predetermined number of iterations has been completed. Alternatively or in addition, it may comprise for instance that a value indicating a difference between characteristics of radio transmitters estimated in a current iteration and characteristics of radio transmitters estimated in a preceding iteration falls short of a predetermined value. This may have the effect that processing power is saved in case further iterations do not appear to result in a further improvement of the characteristics of the radio transmitters.

In example embodiments, refined sequences of fingerprints of a final iteration and/or characteristics of radio transmitters estimated in a final iteration are furthermore used for generating a radio map. The generated radio map may be provided as a basis for positioning mobile devices.

In example embodiments, new batches of data may be obtained from each of a plurality of mobile devices after final characteristics of the plurality of radio transmitters have been determined. This may have the effect that missing radio transmitter characteristics may be completed, that existing radio transmitter characteristics may be improved and/or that changes in the radio environment may be taken into account. Exclusively the newly obtained batches may be used for generating a new radio map, independently of the previously generated radio map. Alternatively, exclusively the newly obtained batches may be used for updating the previously generated radio map. Further alternatively, the previously obtained batches and the newly obtained batches may be used in combination for generating a new radio map independently of the previously generated radio map. Further alternatively, the previously obtained batches and the newly obtained batches may be used in combination for updating the previously generated radio map. With any alternative, an existing radio map identifying radio transmitter characteristics may or may not be used as preliminary information. If it is used as preliminary information, actions 202 and 203 may be omitted in the process of FIG. 2 when processing the newly obtained batches.

Figure 3:
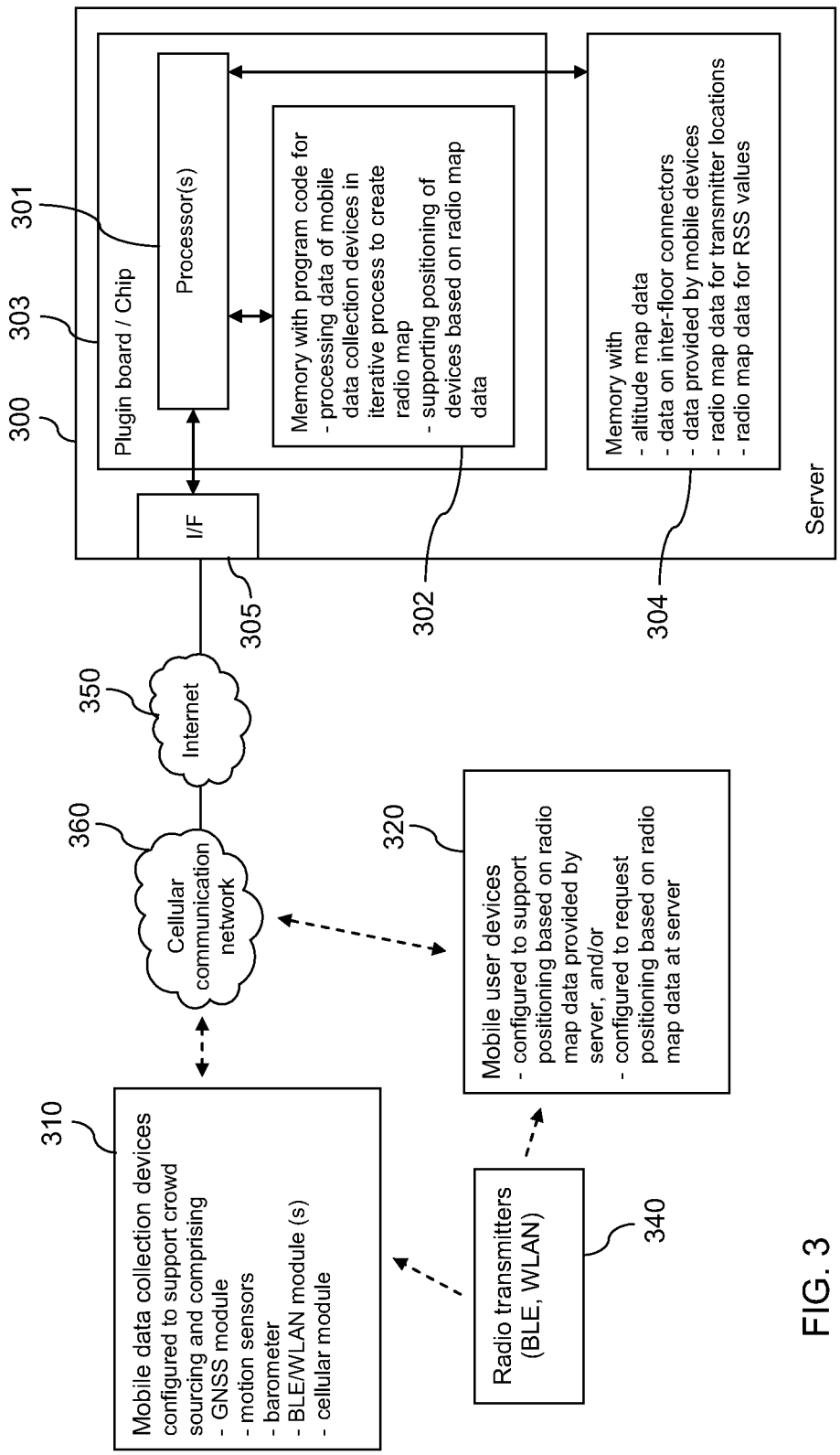
FIG. 3 is a schematic block diagram of an example embodiment of a system.

FIG. 3 is a schematic block diagram of an example embodiment of a system supporting a creation of a radio map for at least one site, for instance in a large building like a shopping-mall.

The system comprises a server 300, mobile data collection devices 310 and mobile user devices 320. It is to be understood that a mobile device may support any combination of the functions associated with devices 310 and 320. The system further comprises a plurality of radio transmitters 340. The Internet 350 may enable a connection between server 300 and other devices. A mobile communication network 360 and/or at least one WLAN may enable mobile devices 310, 320 to access the Internet 350 and thus server 300.

Server 300 may be for instance a dedicated location server or a general purpose server. Server 300 comprises a processor 301 that is linked to a first memory 302, to a second memory 304, and to an interface 305.

Processor 301 is configured to execute computer program code, including computer program code stored in memory 302, in order to cause server 300 to perform desired actions. It is to be understood that processor 301 may comprise or have access to a working memory for this purpose, for example in the form of a random access memory (not shown).

Memory 302 stores computer program code for processing data of mobile devices in an iterative process to create a radio map with radio transmitter locations and computer program code for supporting a positioning of devices based on radio map data. Memory 302 may also store any other kind of computer program code, like computer program code for generating a radio map that assigns RSS values for radio transmitters at the site to grid points of a grid. Memory 302 may also store for instance an operating system for server 300. In addition, memory 302 may store any kind of data.

Processor 301 and memory 302 may optionally belong to a module 303, like a plug-in board or a chip or an integrated circuit or any other kind of processing circuitry, which may comprise in addition various other components, for instance a further processor or a further memory.

Memory 304 is configured to store data, including for example altitude map data for one or more sites, data on inter-floor connectors for one or more sites, batches of data received from mobile data collection devices 310, radio map data for radio transmitter locations. In addition, memory 304 may also store any other kind of data, for instance grid based radio map data with RSS values. It is to be understood that some or all of the data could also be stored in a database using a memory external to server 300.

Interface 305 is configured to enable a communication with other devices, for instance via the Internet 350.

It is to be understood that server 300 may comprise various other components, like a user interface.

It is to be understood that the functions of server 300 may also be performed in the cloud in a distributed manner.

A mobile data collection device 310 may be for instance a regular mobile terminal, like a smartphone or general purpose tablet PC. The user of mobile data collection device 310 may be any user who agreed to support crowd-sourcing at one or more sites and who downloaded a corresponding application.

Each mobile data collection device 310 comprises a GNSS module, motion sensors, and a BLE and/or WLAN module. Each mobile data collection device 310 comprises optionally a barometer and/or a cellular module. It may comprise various further components, like a user interface.

The GNSS module of mobile data collection device 310 may comprise any kind of global navigation satellite signal receiver, for example a GPS receiver and/or a GLONASS receiver and/or a Galileo receiver. It may be configured to receive corresponding satellite signals and to determine the current position of mobile device 310 based on the signals, possibly using provided assistance data.

The motion sensors of mobile data collection device 310 may include for instance accelerometers, gyroscopes and a compass.

The barometer of mobile data collection device 310 may be configured to measure and output pressure values, altitude values or values indicating changes in altitude.

The BLE module of mobile data collection device 310 is configured to receive radio signals transmitted by BLE beacons 340. The WLAN module is configured to communicate with WLAN access points 340.

The cellular module of mobile data collection device 310 may be configured to enable a communication with nodes of cellular communication network 360. Such a cellular module may be provided alternatively or in addition to a WLAN module. The WLAN module and/or the cellular module may enable mobile survey device 310 to access server 300 via a WLAN or cellular communication network 360 and further via the Internet 350.

Mobile user devices 320 represent devices that may desire to know their own position at the site. The position may be requested for instance by an internal application or by some other device. Any of mobile user devices 320 may be for instance a regular mobile terminal, like a smartphone or general purpose tablet PC, or it may be for instance an Internet of Things (IoT) device, like a smart watch or a smart band, etc. It is configured to perform measurements on signals transmitted by at least one type of radio transmitters 340. It is further configured to compute its own position based on radio map data provided by server 300 and/or to obtain a computed position from server 300 upon request. Any of mobile user devices 320 may be configured to access server 300 for instance via a cellular communication network 360 and/or some WLAN and further via the Internet 350.

The radio transmitters 340 may, for instance, be or belong to WLAN access points of at least one WLAN and/or BLE beacons. They may be distributed at the site such that at least one radio transmitter may be observed at essentially each location of the site at which a positioning of mobile user devices 320 is to be supported. Each of the radio transmitters 340 may be configured to transmit radio signals at regular intervals. These radio signals are provided to be used by mobile user devices 320 for positioning purposes. Optionally, they may be used for other purposes in addition.

Figure 4:
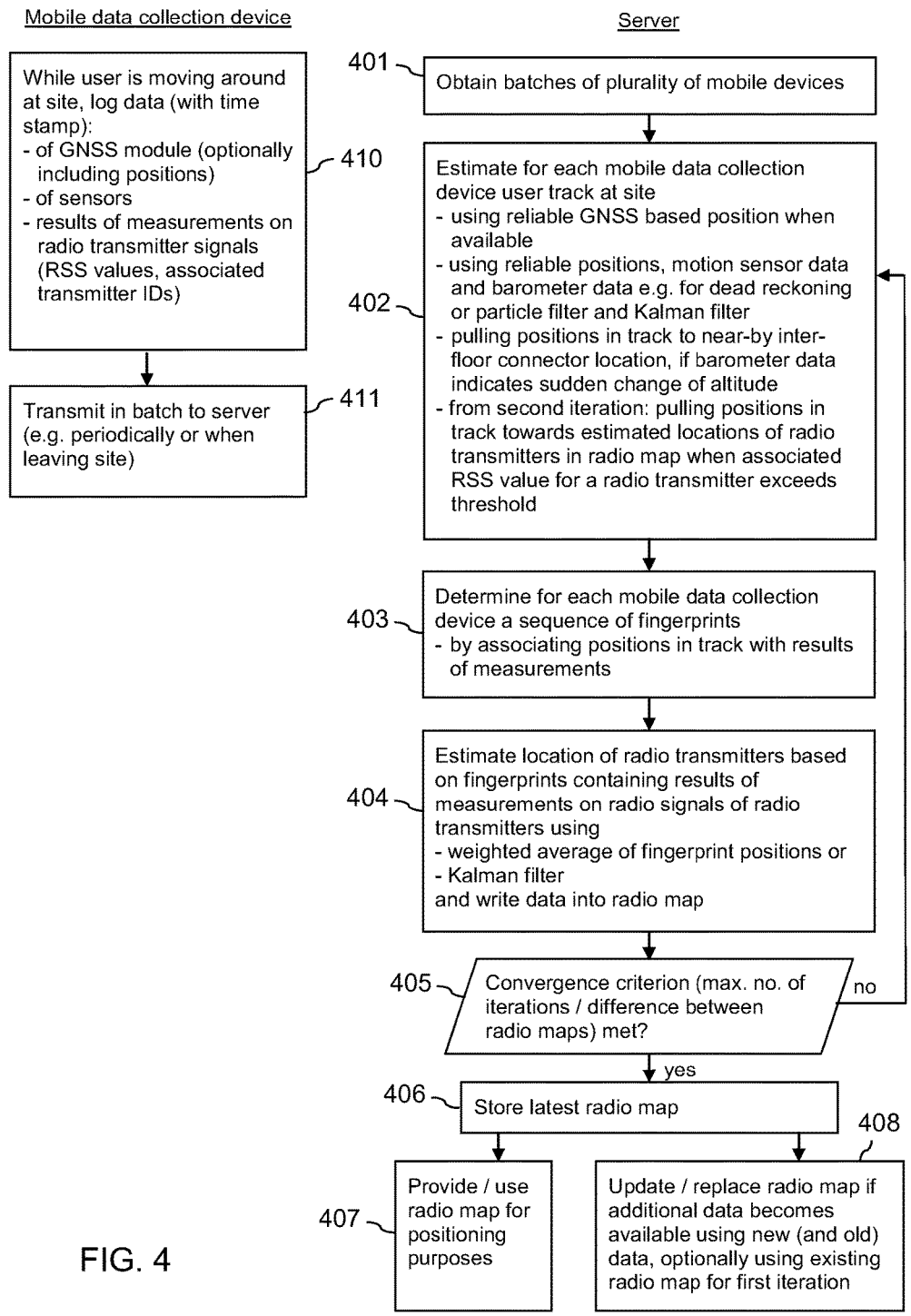
FIG. 4 is a flow chart illustrating an example embodiment of operations in the system of FIG. 3.

FIG. 4 is a flow chart illustrating example operations in the system of FIG. 3. Mobile data collection devices 310 are caused by a downloaded application to perform the actions presented on the left hand side. Processor 301 and some of the program code stored in memory 302 cause server 300 to perform the actions presented on the right hand side when corresponding program code is retrieved from memory 302 and executed by processor 301.

At the site, all radio transmitters 340 regularly transmit radio signals including at least their identifier (ID). The identifier may be for instance a medium access control (MAC) address of a transmitting BLE beacon or of a WLAN access point. The transmission power may be set to a fixed value, at least per type of radio transmitter. The locations of some or all radio transmitters 340 may be unknown. The locations of some or all radio transmitters 340 are to be determined as reference locations and assembled in a radio map for the site.

The operations of FIG. 4 rely on a plurality of mobile data collection devices 310 performing measurements on the radio signals. A particular mobile data collection device 310 may be an active mobile data collection device 310, which performs measurements on the radio signals, for instance whenever the user activates the downloaded application, or whenever the GNSS module of mobile data collection device 310 determines a position close to the site.

While a user of an active mobile data collection device 310 moves around at the site, mobile data collection device 310 collects data at regular intervals and stores the data in an internal memory. Each entry in the memory may be provided with a time stamp. (action 410)

An entry of data may comprise data provided by the GNSS module of mobile data collection device 310, as far as available, results of measurements of the motion sensors of mobile data collection device 310, data output by the barometer of mobile data collection device 310, and results of measurements on radio signals received from one or more radio transmitters 340. It is to be understood that either a common entry with a common time stamp may be generated for the data or that separate entries with an individual time stamp may be generated for different types of data.

The GNSS module may receive and process satellite signals whenever possible. Optionally, though not necessarily, the GNSS module may determine and provide the position of mobile data collection device 310 based on the satellite signals for storage. Alternatively, it may provide a decoded navigation message and measurement results for each satellite of which signals are being received for storage. It may not always be possible to detect satellite signals, and it may not always be possible to determine a position or an accurate position based of the currently received satellite signals.

The results of measurements on radio signals of radio transmitters 340 are obtained by mobile data collection device 310 during regular scans. They comprise for each entry the identifiers of the radio transmitters 340 extracted from the currently received radio signals and associated with each identifier an RSS value.

Mobile data collection device 310 transmits the stored entries as a batch to server 300. The data may be transmitted for instance periodically, or when the user deactivates the application, or when it is detected that mobile data collection device 310 leaves the site. (action 411) The transmission may take place for instance via the cellular network 360 or a WLAN and the Internet 350.

Server 300 receives a batch of data for the site from a plurality of mobile data collection devices 310. The data may be stored in memory 304. (action 401) When batches for a site are to be processed, the data is retrieved from memory 304. The batches may be processed, for instance, when a predetermined number of batches are available for a site, or at predetermined or individually set instances of time.

When processing the batches for a site, server 300 estimates for each mobile data collection devices 310 a user track at the site. The track indicates the estimated position of the user for each instance of time that is indicated by the time stamps in the batch of data obtained from the respective mobile data collection device 310. (action 402)

A GNSS based position may be used whenever it may be determined from the available data and whenever it is indicated to have a low uncertainty. In a simple approach, each reliable GNSS based position may be used for instance as a reference position for dead reckoning based on the motion sensor data, until the next reliable GNSS based position is found. The next reliable GNSS based position may not only be used as a reference position for future dead reckoning using motion sensor data, but also for verifying and adjusting the general orientation of the previously determined dead reckoning based section of the track. However, there are many more sophisticated known approaches to fuse GNSS data with data from motion sensors. One option is to use a particle filter for horizontal location estimation and a Kalman filter in combination with a stored altitude map and barometer data for altitude estimation.

During the process, the barometer data may also be used for determining additional reference locations for the track. For example, if the barometer data indicates a sudden change in altitude, it may be determined whether the currently determined position is close to an inter-floor connection location. If there is a near-by inter-floor connection location, this location is considered to be a reliable reference location for the track, and the determined position of mobile data collection device 310 that is associated with the change in altitude is pulled towards the inter-floor connection location. It is to be understood that preceding and subsequent positions may be adjusted accordingly to obtain a smooth transition.

Server 300 then determines for each mobile data collection device 310 a sequence of fingerprints. To this end, server 300 associates the positions in the estimated track with results of measurements on radio signals having a corresponding time stamp. (action 403)

Server 300 may now estimate the location of radio transmitters 340 based on the assembled sequences of fingerprints that have been determined for the plurality of mobile data collection devices 310. (action 404) The locations may be determined in different ways.

For instance, the location of a radio transmitter 340 may be estimated to correspond to the weighted average of the estimated positions in those fingerprints, which comprise RSS values for the radio transmitter 340 in question. The selected weights may be for instance inversely proportional to the uncertainties of the positions in the fingerprints. An uncertainty of a respective position in a fingerprint may be determined in various manners. It may correspond for instance to the difference in time between the time stamp in a fingerprint and the time stamp in the last fingerprint of the same sequence of fingerprints with reliable reference position (i.e., which is GNSS based with high accuracy or which is inter-floor connector location based). An uncertainty of a position in a fingerprint may further correspond for instance to a distance to an arithmetic mean or median of all estimated positions at which signals of the radio transmitter 340 have been detected according to all fingerprints of all sequences of fingerprints. An uncertainty of a position in a fingerprint may further correspond for instance to the size of an ellipse comprising a certain percentage (e.g. 95%) of estimated positions of mobile data collection devices 310 with an associated identifier of the radio transmitter 340 in all fingerprints. An uncertainty of a position may also result when a particle and/or a Kalman filter is applied in action 402. Alternatively or in addition, the selected weight for an estimated position in a fingerprint may be for instance proportional to the RSS value associated with the identifier of the radio transmitter 340 in the fingerprint on a linear scale. A selected weight may for instance have a component that is inversely proportional to the uncertainty of a position in a fingerprint and a component that is proportional to the RSS value associated with the identifier of the radio transmitter 340 in the fingerprint.

Alternatively, the location of a radio transmitter 340 may be determined for instance using a Kalman filter. When estimating the location of a radio transmitter using a Kalman filter, the radio transmitter location may be the static filter state (that is, the stationary state transition model with very small process noise) and the fingerprint positions and their uncertainties may be the measurements of the state.

The estimated locations of all radio transmitters 340 of which identifiers are contained in the sequences of fingerprints for the site are written into a radio map. The radio map comprises at least an association between locations and radio transmitter identifiers.

Next, server 300 checks whether at least one convergence criterion has already been met. (action 405) As long as this is not the case, actions 402 to 405 are continued in a loop. A first convergence criterion may be that the number iterations has reached a predetermined value (e.g. 5 iterations in the loop). A second convergence criterion may be that the difference between the currently obtained radio map and the radio map obtained in the preceding iteration falls short of a predetermined value. This difference between radio maps may be for instance the average change in the estimated locations of the radio transmitters 340. It is to be understood that both convergence criteria are not yet relevant after the first iteration of the loop for a site.

In each iteration, the data of all of the batches obtained in action 401 from the plurality of mobile data collection devices 310 are reprocessed to generate an improved radio map.

Starting from the second iteration of the loop, the estimation of the user track for each mobile data collection device 310 in action 402 is supplemented. More specifically, the stored locations of the radio transmitters 340 estimated in the respectively preceding iteration and written into the radio map in action 404 are considered as reference locations in addition to the GNSS based reference position(s) and optionally in addition to the inter-floor connector based reference location(s). When determining the track in action 402, a position for a particular time stamp is pulled towards a location of a radio transmitter 340 defined in the radio map, if an RSS value for the radio transmitter 340 associated with the time stamp exceeds a predetermined threshold. The threshold for the RSS value may be set to a value that ensures that the mobile data collection device 310 was within a radius of 2-3 meters around the radio transmitter 340 when measuring the RSS value. The threshold may be set differently for different types of radio transmitters 340, for instance for WLAN access points and BLE beacons, depending on the used transmission power.

The presented iterative approach allows stitching tracks of a plurality of mobile data collection devices 310 together so that with each iteration the information about locations of radio transmitters 340, and thus stitching points, is improved.

Once it is determined in action 405 that at least one convergence criterion is met, the latest radio map with radio transmitter locations is stored in memory 304 as final radio map for the existing batches of data. (action 406)

The radio map data for the radio transmitter locations is provided for positioning purposes. (action 407) The radio map data may be used at server 300 or be transmitted to mobile user devices 320. A mobile user device 320 detecting radio signals from one or more radio transmitters 340 may use the radio map data for instance for estimating its current position by means of triangulation. The triangulation may weight the impact of the location of each observed radio transmitter 340 in proportion to the received signal strength. Alternatively, a mobile user device 320 detecting radio signals from one or more radio transmitters 340 may send a positioning request to server 300, the request including RSS values of received radio signals and contained identifiers of radio transmitters 340. Server 300 may then use the radio map data for estimating the current position of the requesting mobile device 320 and make the estimated position available.

In addition, server 300 may generate a grid based radio map for RSS values based on all fingerprints determined in action 403 of the last iteration for the site. The grid is defined to cover the site such that each grid point corresponds to a geographical location at the site. If the site comprises several floors, a separate grid may be defined for each floor, or a single three dimensional grid may be defined with one dimension for the different floors. The grid based radio map may be generated by mapping the RSS value(s) and the associated radio transmitter ID(s) of each fingerprint to the grid point that corresponds to a geographical location that is closest to the position indicated in the fingerprint. If there are several RSS values for the same radio transmitter 340 that would be mapped to the same grid pint, some kind of average value may be used, for instance the arithmetic mean or the median value. For grid points to which no RSS values could be mapped due to missing fingerprints from the corresponding areas at the site, RSS values may be generated by interpolating surrounding RSS values if possible, and by extrapolating neighboring RSS values otherwise. Server 300 stores the grid based radio map data in memory 304 or in some external memory.

Such a grid based radio map for RSS values may be provided and used for positioning purposes alternatively or in addition to the radio map for the radio transmitter locations.

The stored radio map for the radio transmitter locations (and accordingly a grid based radio map for RSS values) may be updated or replaced, if additional batches of data are received from a plurality of mobile devices. (action 408)

For replacing the radio map, only the new batches may be considered. In this case, the process described with reference to actions 401 to 407 may simply be performed again using the new batches. The previous determined radio map for radio transmitter locations may be discarded completely. Optionally, it may be used in the first iteration in action 402 in order to be able to consider first reference locations from the beginning, before it is discarded. Alternatively, the old radio map may not be replaced, but updated. This may have the effect that knowledge about radio transmitters 340, for which no data is contained in the new batches, may not be lost. The update may optionally be realized as a static Kalman filter that smooths the updates.

Alternatively, an existing radio map may be updated or replaced using the newly received batches in addition to the previously received batches. The options for this alternative are the same as indicated for the exclusive use of new batches.

Figure 5A:
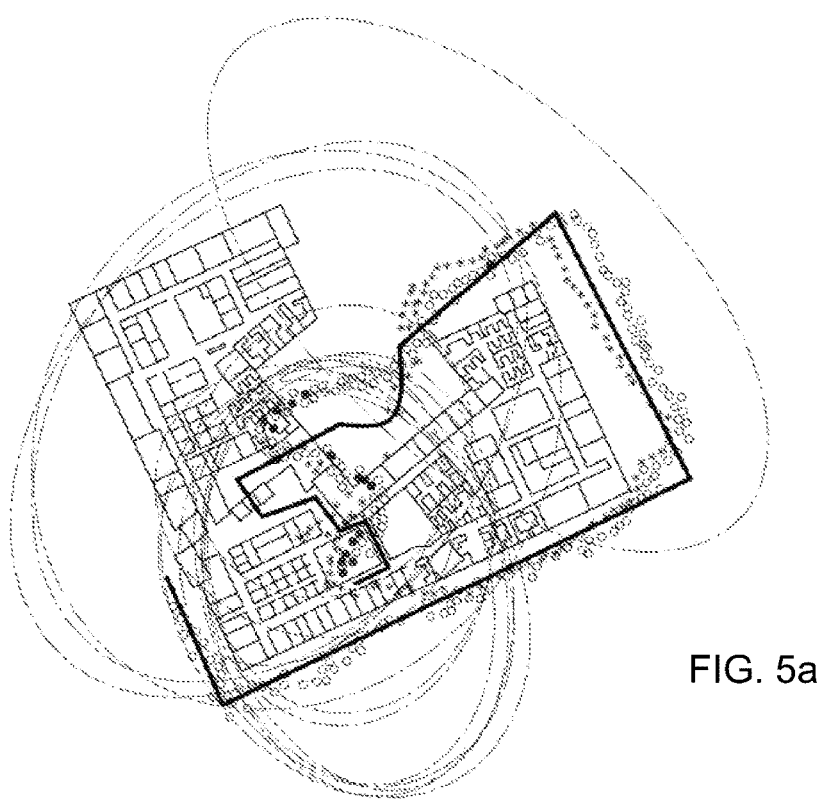
FIG. 5a-b are diagrams illustrating the operation of FIG. 4 by means of a first example.
Figure 5B:
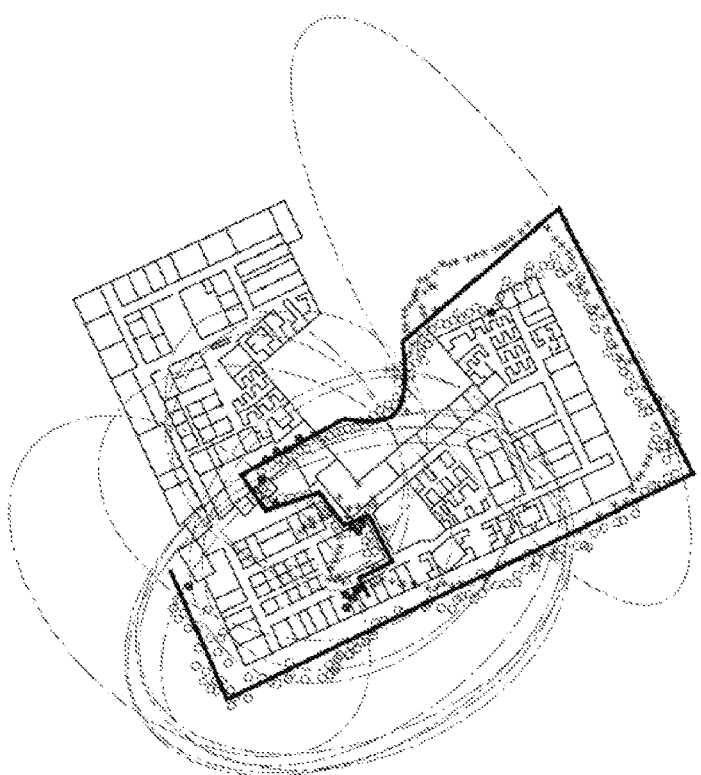
Figure 6A:
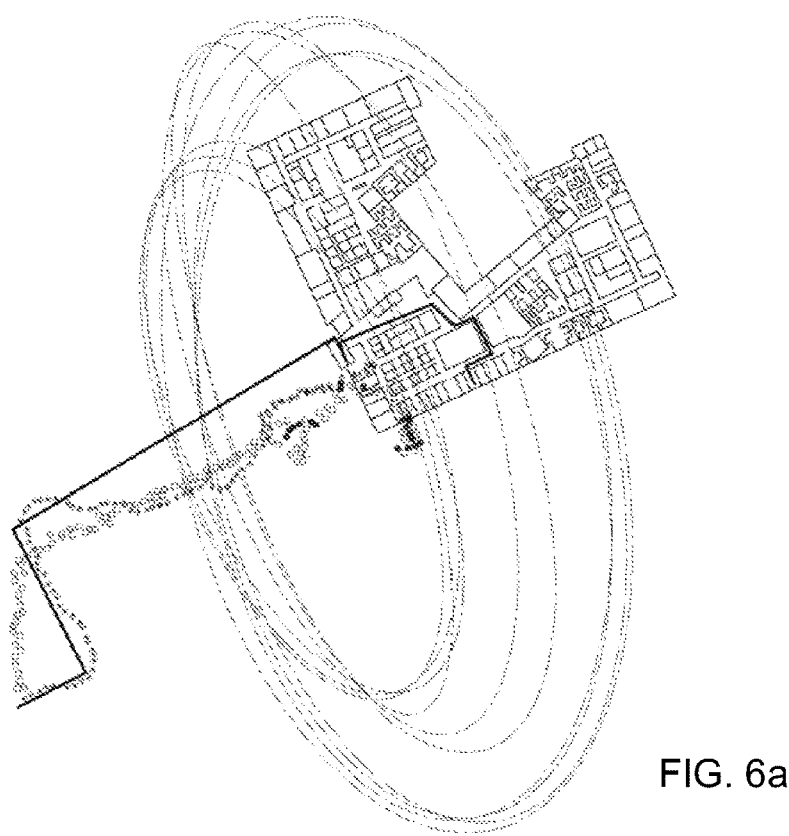
FIG. 6a-b are diagrams illustrating the operation of FIG. 4 by means of a second example.
Figure 6B:
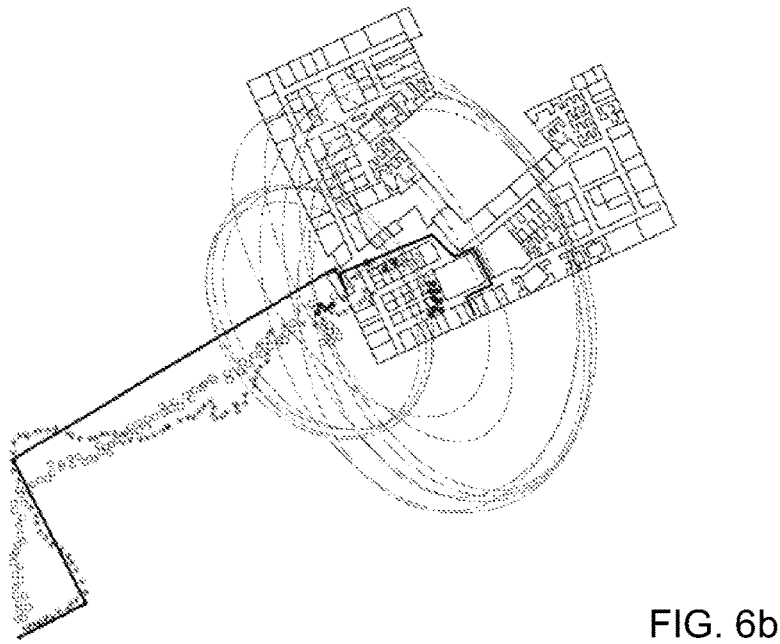

FIGS. 5a and 5b and FIGS. 6a and 6b are diagrams illustrating two different examples of the effect of the operations of FIG. 4. In each of the diagrams, a floor plan of a large building is indicated. A bold line represents the true track of a user using a mobile data collection device 310. In the example of FIGS. 5a and 5b, the user walked partly around the building, entered the building and moved within the building to some destination. In the example of FIGS. 6a and 6b, the user approached the building from some distance, entered the building and moved within the building to some destination. A sequence of small stars represents estimated positions of mobile data collection device 310 that are based on satellite signals only. A sequence of non-filled circles with white center represents a track of mobile data collection device 310 that is based on satellite signals and on motion sensor data, as determined in action 402. Filled black circles represent positions in the track that are associated in the fingerprints with an RSS value exceeding a threshold. Such positions may be used exclusively or with largest weight for estimating locations of radio transmitters 340 in action 404. Ellipses indicate location uncertainty estimates for these positions.

FIGS. 5a and 6a illustrate example results after a first iteration. It can be seen in FIGS. 5a and 6a that in particular within the building, the sequence of non-filled circles deviates significantly from the bold line. Next, during the second iteration, the user tracks are estimated again, but this time a newly generated radio map with radio transmitter locations is used in addition to the GNSS data and the sensor data to improve the track estimation. Whenever at some point along a track there is a strong signal from some radio transmitter 340, the track estimates are pulled in action 402 towards the current estimate for the location of the radio transmitter 340. Therefore, over a large number of tracks and iterations, the radio map is suited to stich corresponding track points— which are associated with high RSS values from a radio transmitter—together. Thus, the tracks of several users become loosely coupled via the radio map.

FIGS. 5b and 6b illustrate example results after a third iteration of operations as presented with reference to FIG. 4. That is, the radio map determined in action 404 of the second iteration was used for estimating the track in action 402 of the third iteration, of which the result is presented. In FIGS. 5b and 6b, the series of non-filled circles representing the respective track of the user starts to get closer to the bold line and thus to the true track. It can furthermore be seen that in FIGS. 5b and 6b, the ellipses are significantly smaller than in FIGS. 5a and 6a, meaning that the uncertainty of the refined fingerprint positions has been improved after the third iteration. This means in turn that the uncertainty of locations of radio transmitters 340 that are estimated based on the fingerprints is decreased. As the process progresses (and possibly as there are more tracks to be taken into account), the user track estimation improves further, and thus a better quality radio map is available for those mobile user devices 320 that use the radio map of radio transmitter locations for positioning.

It is to be understood that the presented example systems, apparatuses and operations may be varied in many ways. The systems and apparatuses may be varied for instance by modifying, adding or omitting components. The operations may be varied for instance by modifying actions, by omitting actions and/or by adding actions. In addition, the order of actions may be modified.

For example, in an alternative embodiment, no inter-floor connectors may be considered.

For example, in an alternative embodiment, the radio transmitters may include other transmitters than BLE beacons or WLAN access points, for example regular Bluetooth transmitters or ultra-sound transmitters, etc.

Summarized, certain embodiments of the disclosure may allow exploiting a natural correlation between tracks that pass through the same physical locations. More information may be extracted from a set of interconnected user tracks than from a set of multiple independent user tracks. Certain embodiments allow compensating for a drifting of sensor-based solutions, for a misalignment at certain points along a track due to a device rotation with respect to the user, for a misorientation due to an uncertainty in heading, and for a misreferencing due to an uncertainty in the initial absolute location. Using inter-floor connectors as reference locations may be suited to reduce such errors in a sensor based track. In various buildings, however, there may be only a limited number of suitable inter-floor connectors and the distances between such building features may be rather large. Using in addition strong signals of a plurality of radio transmitters as stitching points for multiple tracks may automatically result in information regarding the radio transmitter locations as additional reference locations, because very strong signals mean that a radio transmitter is very close. Assembled data on such radio transmitters may be considered to constitute an elementary radio map that can be used for a positioning of other devices.

The following embodiments of the disclosure are also disclosed:

Embodiment 1:

A method comprising, performed by at least one apparatus:
  obtaining from each of a plurality of mobile devices a batch of data for a site, a batch of data from a respective mobile device including:
    data enabling a determination of at least one reference position of the mobile device,
    sensor data of at least one motion sensor of the mobile device, and
    sets of results of measurements performed by the mobile device on radio signals at different locations of the site, each set comprising at least one indication of a received signal strength of radio signals and an associated identifier of at least one radio transmitter transmitting the radio signals;
  processing each batch of data to determine for each mobile device a sequence of fingerprints associating a respective position, which is based on the at least one reference position and the sensor data, with each set of results of measurements;
  estimating at least one characteristic of each of a plurality of radio transmitters based on sequences of fingerprints determined for the plurality of mobile devices; and
  in at least one iteration:
    processing each batch of data to determine for each mobile device a refined sequence of fingerprints associating a respective position, which is based on the at least one reference position, the sensor data and estimated characteristics of the plurality of radio transmitters, with each set of results of measurements; and estimating at least one characteristic of each of the plurality of radio transmitters based on the refined sequences of fingerprints determined for the plurality of mobile devices.

Embodiment 2:

The method according to embodiment 1, wherein the at least one reference position of a respective mobile device comprises a satellite signal based position; and /or a position determined based on at least one barometer value and an altitude map; and /or a position determined based on at least one barometer value and inter-floor connector information.

Embodiment 3:

The method according to embodiment 1 or 2, wherein the sensor data of the at least one motion sensor of a respective mobile device comprises data of an accelerometer of the mobile device, and/or a gyroscope of the mobile device; and/or a compass of the mobile device.

Embodiment 4:

The method according to any one of embodiments 1 to 3, wherein the at least one characteristic of each of a plurality of radio transmitters comprises:

a location of each of the plurality of radio transmitters, and/or a definition of a coverage area of each of the plurality of radio transmitters; and/or a grid based indication of expected received signal strength values at the site for each of the plurality of radio transmitters.

Embodiment 5:

The method according to any one of embodiments 1 to 4, wherein estimating at least one characteristic of a radio transmitter based on sequences of fingerprints comprises estimating a location of the radio transmitter:

as a weighted average of positions associated in the sequences of fingerprints with a set of results of measurements comprising an identifier of the radio transmitter; or as a weighted average of positions associated in the sequences of fingerprints with a set of results of measurements comprising an identifier of the radio transmitter, wherein the weight of a respective position is selected to be inversely proportional to an uncertainty of the position; or as a weighted average of positions associated in the sequences of fingerprints with a set of results of measurements comprising an identifier of the radio transmitter, wherein the weight of a respective position is selected to be proportional to a radio signal strength that is associated in the respective associated set with the identifier of the radio transmitter; or using a Kalman filter.

Embodiment 6:

The method according to any one of embodiments 1 to 5, wherein a respective position in a refined sequence of fingerprints is pulled towards an estimated location of a radio transmitter that corresponds to or is based on the at least one characteristic of the radio transmitter, when an indication of a received signal strength associated with the identifier of the radio transmitter in a set of results of measurements exceeds a predetermined value.

Embodiment 7:

The method according to any one of embodiments 1 to 6, wherein the at least one iteration is repeated until a predetermined convergence criterion is met; and/or a predetermined number of iterations has been completed; and/or a value indicating a difference between characteristics of radio transmitters estimated in a current iteration and characteristics of radio transmitters estimated in a preceding iteration falls short of a predetermined value.

Embodiment 8:

The method according to any one of embodiments 1 to 7, further comprising using refined sequences of fingerprints of a final iteration and/or characteristics of radio transmitters estimated in a final iteration for generating a radio map and providing the radio map as a basis for positioning mobile devices.

Embodiment 9:

The method according to embodiment 8, further comprising obtaining new batches of data from each of a plurality of mobile devices and using exclusively the newly obtained batches for generating a new radio map independently of the previously generated radio map; or using exclusively the newly obtained batches for updating the previously generated radio map; or using the previously obtained batches and the newly obtained batches in combination for generating a new radio map independently of the previously generated radio map; or using the previously obtained batches and the newly obtained batches in combination for updating the previously generated radio map.

Embodiment 10:

A system comprising at least one apparatus, the at least one apparatus comprising means for causing performance of the actions of the method of any one of embodiments 1 to 9.

Embodiment 11:

The system according to embodiment 10, wherein the system is:

a module for a server; or a server; or a combination of a plurality of servers.

Embodiment 12:

A system comprising at least one processor and at least one memory, wherein the at least one memory includes computer program code, the at least one memory and the computer program code configured to, with the at least one processor, cause at least one device at least to:

obtain from each of a plurality of mobile devices a batch of data for a site, a batch of data from a respective mobile device including:

data enabling a determination of at least one reference position of the mobile device, sensor data of at least one motion sensor of the mobile device, and sets of results of measurements performed by the mobile device on radio signals at different locations of the site, each set comprising at least one indication of a received signal strength of radio signals and an associated identifier of at least one radio transmitter transmitting the radio signals;

process each batch of data to determine for each mobile device a sequence of fingerprints associating a respective position, which is based on the at least one reference position and the sensor data, with each set of results of measurements;

estimate at least one characteristic of each of a plurality of radio transmitters based on sequences of fingerprints determined for the plurality of mobile devices; and in at least one iteration:
process each batch of data to determine for each mobile device a refined sequence of fingerprints associating a respective position, which is based on the at least one reference position, the sensor data and estimated characteristics of the plurality of radio transmitters, with each set of results of measurements; and estimate at least one characteristic of each of the plurality of radio transmitters based on the refined sequences of fingerprints determined for the plurality of mobile devices.

Embodiment 13:
The system according to embodiment 12, wherein the at least one reference position of a respective mobile device comprises
a satellite signal based position; and /or
a position determined based on at least one barometer value and an altitude map; and /or
a position determined based on at least one barometer value and inter-floor connector information.

Embodiment 14:
The system according to embodiment 12 or 13, wherein the sensor data of the at least one motion sensor of a respective mobile device comprises data of
an accelerometer of the mobile device, and/or
a gyroscope of the mobile device; and/or
a compass of the mobile device.

Embodiment 15:
The system according to any one of embodiments 12 to 14, wherein the at least one characteristic of each of a plurality of radio transmitters comprises:
a location of each of the plurality of radio transmitters, and/or
a definition of a coverage area of each of the plurality of radio transmitters; and/or
a grid based indication of expected received signal strength values at the site for each of the plurality of radio transmitters.

Embodiment 16:
The system according to any one of embodiments 12 to 15, wherein estimating at least one characteristic of a radio transmitter based on sequences of fingerprints comprises estimating a location of the radio transmitter:
as a weighted average of positions associated in the sequences of fingerprints with a set of results of measurements comprising an identifier of the radio transmitter; or
as a weighted average of positions associated in the sequences of fingerprints with a set of results of measurements comprising an identifier of the radio transmitter, wherein the weight of a respective position is selected to be inversely proportional to an uncertainty of the position; or
as a weighted average of positions associated in the sequences of fingerprints with a set of results of measurements comprising an identifier of the radio transmitter, wherein the weight of a respective position is selected to be proportional to a radio signal strength that is associated in the respective associated set with the identifier of the radio transmitter; or
using a Kalman filter.

Embodiment 17:
The system according to any one of embodiments 12 to 16, wherein a respective position in a refined sequence of fingerprints is pulled towards an estimated location of a radio transmitter that corresponds to or is based on the at least one characteristic of the radio transmitter, when an indication of a received signal strength associated with the identifier of the radio transmitter in a set of results of measurements exceeds a predetermined value.

Embodiment 18:
The system according to any one of embodiments 12 to 17, wherein the at least one memory and the computer program code are configured to, with the at least one processor, cause the at least one device to repeat the at least one iteration until
a predetermined convergence criterion is met; and/or
a predetermined number of iterations has been completed; and/or
a value indicating a difference between characteristics of radio transmitters estimated in a current iteration and characteristics of radio transmitters estimated in a preceding iteration falls short of a predetermined value.

Embodiment 19:
The system according to any one of embodiments 12 to 18, wherein the at least one memory and the computer program code are further configured to, with the at least one processor, cause the at least one device to use refined sequences of fingerprints of a final iteration and/or characteristics of radio transmitters estimated in a final iteration for generating a radio map and to provide the radio map as a basis for positioning mobile devices.

Embodiment 20:
The system according to embodiment 19, wherein the at least one memory and the computer program code are further configured to, with the at least one processor, cause the at least one device to obtain new batches of data from each of a plurality of mobile devices and
to use exclusively the newly obtained batches for generating a new radio map independently of the previously generated radio map; or
to use exclusively the newly obtained batches for updating the previously generated radio map; or
to use the previously obtained batches and the newly obtained batches in combination for generating a new radio map independently of the previously generated radio map; or
to use the previously obtained batches and the newly obtained batches in combination for updating the previously generated radio map.

Embodiment 21:
The system according to any of embodiments 12 to 20, wherein the system is:
a module for a server; or
a server; or
a combination of a plurality of servers.

Embodiment 22:
A computer program code, which is configured to causes at least one device to perform the actions of the methods of any one of embodiments 1 to 9 when executed by at least one processor.

Embodiment 23:
A computer readable storage medium in which computer program code is stored, the computer program code causing at least one device to perform the following when executed by at least one processor:
obtain from each of a plurality of mobile devices a batch of data for a site, a batch of data from a respective mobile device including:
data enabling a determination of at least one reference position of the mobile device, sensor data of at least one motion sensor of the mobile device, and sets of results of measurements performed by the mobile device on radio signals at different locations of the site, each set comprising at least one indication of a received signal strength of radio signals and an associated identifier of at least one radio transmitter transmitting the radio signals;

process each batch of data to determine for each mobile device a sequence of fingerprints associating a respective position, which is based on the at least one reference position and the sensor data, with each set of results of measurements;

estimate at least one characteristic of each of a plurality of radio transmitters based on sequences of fingerprints determined for the plurality of mobile devices; and in at least one iteration:

process each batch of data to determine for each mobile device a refined sequence of fingerprints associating a respective position, which is based on the at least one reference position, the sensor data and estimated characteristics of the plurality of radio transmitters, with each set of results of measurements; and estimate at least one characteristic of each of the plurality of radio transmitters based on the refined sequences of fingerprints determined for the plurality of mobile devices.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/ software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

A bus may be provided for connecting processor(s) and memories.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

In example embodiments, any non-transitory computer readable medium mentioned in this text could also be a removable/portable storage or a part of a removable/portable storage instead of an integrated storage. Example embodiments of such a removable storage comprise a magnetic disc storage, of an optical disc storage, a semiconductor memory circuit device storage and of a Micro-SD semiconductor memory card storage.

The functions illustrated by processor 101 in combination with memory 102, or processor 301 in combination with memory 302, or component 303 can also be viewed as means for obtaining from each of a plurality of mobile devices a batch of data for a site, a batch of data from a respective mobile device including: data enabling a determination of at least one reference position of the mobile device, sensor data of at least one motion sensor of the mobile device, and sets of results of measurements performed by the mobile device on radio signals at different locations of the site, each set comprising at least one indication of a received signal strength of radio signals and an associated identifier of at least one radio transmitter transmitting the radio signals; means for processing each batch of data to determine for each mobile device a sequence of fingerprints associating a respective position, which is based on the at least one reference position and the sensor data, with each set of results of measurements; means for estimating at least one characteristic of each of a plurality of radio transmitters based on sequences of fingerprints determined for the plurality of mobile devices; and means for - in at least one iteration - processing each batch of data to determine for each mobile device a refined sequence of fingerprints associating a respective position, which is based on the at least one reference position, the sensor data and estimated characteristics of the plurality of radio transmitters, with each set of results of measurements, and estimating at least one characteristic of each of the plurality of radio transmitters based on the refined sequences of fingerprints determined for the plurality of mobile devices.

The program codes in memory 102 and memory 302 can also be viewed as comprising such means in the form of functional modules.

FIGS. 2 and 4 may also be understood to represent example functional blocks of computer program codes supporting a creation of a radio map.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method comprising, performed by at least one apparatus:
   obtaining from each of a plurality of mobile devices a batch of data for a site, a batch of data from a respective mobile device including:
   data enabling a determination of at least one reference position of the mobile device,
   sensor data of at least one motion sensor of the mobile device, and
   sets of results of measurements performed by the mobile device on radio signals at different locations of the site, each set comprising at least one indication of a received signal strength of radio signals and an associated identifier of at least one radio transmitter transmitting the radio signals;
   processing each batch of data to determine for each mobile device a sequence of fingerprints associating a respective position, which is based on the at least one reference position and the sensor data, with each set of results of measurements;
   estimating at least one characteristic of each of a plurality of radio transmitters based on sequences of fingerprints determined for the plurality of mobile devices;
   in at least a first iteration:
   processing each batch of data to determine for each mobile device a refined sequence of fingerprints associating a respective position, which is based on the at least one reference position, the sensor data and estimated characteristics of the plurality of radio transmitters, with each set of results of measurements; and
   estimating at least one characteristic of each of the plurality of radio transmitters in a first radio map based on the refined sequences of fingerprints determined for the plurality of mobile devices,
   in at least a second iteration, generating a second radio map;
   determining whether a convergence criterion has been met based on the first iteration and the second iteration or the first radio map and the second radio map;
   wherein the convergence criterion is based on a difference between a first radio transmitter location for the first radio map and a second radio transmitter location for the second radio map being less than a predetermined value; and
   providing the second radio map in response to the convergence criterion being met.

2. The method according to claim 1, wherein the at least one reference position of a respective mobile device comprises
   a satellite signal based position; and/or
   a position determined based on at least one barometer value and an altitude map; and/or
   a position determined based on at least one barometer value and inter-floor connector information.

3. The method according to claim 1, wherein the sensor data of the at least one motion sensor of a respective mobile device comprises data of
   an accelerometer of the mobile device, and/or
   a gyroscope of the mobile device; and/or
   a compass of the mobile device.

4. The method according to claim 1, wherein the at least one characteristic of each of a plurality of radio transmitters comprises:
   a location of each of the plurality of radio transmitters, and/or
   a definition of a coverage area of each of the plurality of radio transmitters; and/or
   a grid based indication of expected received signal strength values at the site for each of the plurality of radio transmitters.

5. The method according to claim 1, wherein estimating at least one characteristic of a radio transmitter based on sequences of fingerprints comprises estimating a location of the radio transmitter:
   as a weighted average of positions associated in the sequences of fingerprints with a set of results of measurements comprising an identifier of the radio transmitter; or
   as a weighted average of positions associated in the sequences of fingerprints with a set of results of measurements comprising an identifier of the radio transmitter, wherein the weight of a respective position is selected to be inversely proportional to an uncertainty of the position; or
   as a weighted average of positions associated in the sequences of fingerprints with a set of results of measurements comprising an identifier of the radio transmitter, wherein the weight of a respective position is selected to be proportional to a radio signal strength that is associated in the respective associated set with the identifier of the radio transmitter; or
   using a Kalman filter.

6. The method according to claim 1, wherein a respective position in a refined sequence of fingerprints is pulled towards an estimated location of a radio transmitter that corresponds to or is based on the at least one characteristic of the radio transmitter, when an indication of a received signal strength associated with the identifier of the radio transmitter in a set of results of measurements exceeds a predetermined value.

7. The method according to claim 1, further comprising using refined sequences of fingerprints of a final iteration and/or characteristics of radio transmitters estimated in a final iteration for generating a radio map and providing the radio map as a basis for positioning mobile devices.

8. The method according to claim 7, further comprising obtaining new batches of data from each of a plurality of mobile devices and
   using exclusively the newly obtained batches for generating a new radio map independently of the previously generated radio map; or
   using exclusively the newly obtained batches for updating the previously generated radio map; or
   using the previously obtained batches and the newly obtained batches in combination for generating a new radio map independently of the previously generated radio map; or
   using the previously obtained batches and the newly obtained batches in combination for updating the previously generated radio map.

9. A system comprising at least one processor and at least one memory, wherein the at least one memory includes computer program code, the at least one memory and the computer program code configured to, with the at least one processor, cause at least one device at least to:

obtain from each of a plurality of mobile devices a batch of data for a site, a batch of data from a respective mobile device including:
data enabling a determination of at least one reference position of the mobile device,
sensor data of at least one motion sensor of the mobile device, and
sets of results of measurements performed by the mobile device on radio signals at different locations of the site, each set comprising at least one indication of a received signal strength of radio signals and an associated identifier of at least one radio transmitter transmitting the radio signals;
process each batch of data to determine for each mobile device a sequence of fingerprints associating a respective position, which is based on the at least one reference position and the sensor data, with each set of results of measurements;
estimate at least one characteristic of each of a plurality of radio transmitters based on sequences of fingerprints determined for the plurality of mobile devices;
in at least a first iteration:
process each batch of data to determine for each mobile device a refined sequence of fingerprints associating a respective position, which is based on the at least one reference position, the sensor data and estimated characteristics of the plurality of radio transmitters, with each set of results of measurements; and
estimate at least one characteristic of each of the plurality of radio transmitters in a first radio map based on the refined sequences of fingerprints determined for the plurality of mobile devices;
in at least a second iteration, generate a second radio map;
determine whether a convergence criterion has been met based on the first iteration and the second iteration or the first radio map and the second radio map;
wherein the convergence criterion is based on a difference between the first radio map and the second radio map being less than a predetermined value and the convergence criterion is based on a predetermined number of iterations has been completed; and
provide the second radio map in response to the convergence criterion being met.

10. The system according to claim 9, wherein the at least one reference position of a respective mobile device comprises
a satellite signal based position; and/or
a position determined based on at least one barometer value and an altitude map; and/or
a position determined based on at least one barometer value and inter-floor connector information.

11. The system according to claim 9, wherein the sensor data of the at least one motion sensor of a respective mobile device comprises data of
an accelerometer of the mobile device, and/or
a gyroscope of the mobile device; and/or
a compass of the mobile device.

12. The system according to claim 9, wherein the at least one characteristic of each of a plurality of radio transmitters comprises:
a location of each of the plurality of radio transmitters, and/or
a definition of a coverage area of each of the plurality of radio transmitters; and/or
a grid based indication of expected received signal strength values at the site for each of the plurality of radio transmitters.

13. The system according to claim 9, wherein estimating at least one characteristic of a radio transmitter based on sequences of fingerprints comprises estimating a location of the radio transmitter:
as a weighted average of positions associated in the sequences of fingerprints with a set of results of measurements comprising an identifier of the radio transmitter; or
as a weighted average of positions associated in the sequences of fingerprints with a set of results of measurements comprising an identifier of the radio transmitter, wherein the weight of a respective position is selected to be inversely proportional to an uncertainty of the position; or
as a weighted average of positions associated in the sequences of fingerprints with a set of results of measurements comprising an identifier of the radio transmitter, wherein the weight of a respective position is selected to be proportional to a radio signal strength that is associated in the respective associated set with the identifier of the radio transmitter.

14. The system according to claim 9, wherein a respective position in a refined sequence of fingerprints is pulled towards an estimated location of a radio transmitter that corresponds to or is based on the at least one characteristic of the radio transmitter, when an indication of a received signal strength associated with the identifier of the radio transmitter in a set of results of measurements exceeds a predetermined value.

15. The system according to claim 9, wherein the at least one memory and the computer program code are further configured to, with the at least one processor, cause the at least one device to use refined sequences of fingerprints of a final iteration and/or characteristics of radio transmitters estimated in a final iteration for generating a radio map and to provide the radio map as a basis for positioning mobile devices.

16. The system according to claim 15, wherein the at least one memory and the computer program code are further configured to, with the at least one processor, cause the at least one device to obtain new batches of data from each of a plurality of mobile devices and
to use exclusively the newly obtained batches for generating a new radio map independently of the previously generated radio map; or
to use exclusively the newly obtained batches for updating the previously generated radio map; or
to use the previously obtained batches and the newly obtained batches in combination for generating a new radio map independently of the previously generated radio map; or
to use the previously obtained batches and the newly obtained batches in combination for updating the previously generated radio map.

17. The system according to claim 9, wherein the system is:
a module for a server; or
a server; or
a combination of a plurality of servers.

18. A non-transitory computer readable storage medium in which computer program code is stored, the computer program code causing at least one device to perform the following when executed by at least one processor:
obtain from each of a plurality of mobile devices a batch of data for a site, a batch of data from a respective mobile device including:

data enabling a determination of at least one reference position of the mobile device,
sensor data of at least one motion sensor of the mobile device, and
sets of results of measurements performed by the mobile device on radio signals at different locations of the site, each set comprising at least one indication of a received signal strength of radio signals and an associated identifier of at least one radio transmitter transmitting the radio signals;
process each batch of data to determine for each mobile device a sequence of fingerprints associating a respective position, which is based on the at least one reference position and the sensor data, with each set of results of measurements;
estimate at least one characteristic of each of a plurality of radio transmitters based on sequences of fingerprints determined for the plurality of mobile devices; and
in at least a first iteration:
  process each batch of data to determine for each mobile device a refined sequence of fingerprints associating a respective position, which is based on the at least one reference position, the sensor data and estimated characteristics of the plurality of radio transmitters, with each set of results of measurements;
  estimate at least one characteristic of each of the plurality of radio transmitters based on the refined sequences of fingerprints determined for the plurality of mobile devices;
in at least a second iteration, generate a second radio map;
determine whether a convergence criterion has been met based on the first iteration and the second iteration or the first radio map and the second radio map;
  wherein the convergence criterion is based on a difference between a first location for a radio transmitter of the first radio map and a second location for the radio transmitter of the second radio map being less than a predetermined value; and
provide the second radio map in response to the convergence criterion being met.

\* \* \* \* \*